United States Patent
Krishnamachari-Sampath et al.

(10) Patent No.: US 11,016,937 B2
(45) Date of Patent: May 25, 2021

(54) UPDATEABLE DISTRIBUTED FILE FRAMEWORK

(71) Applicant: Microsoft Technology Licensing, LLC, Redmond, WA (US)

(72) Inventors: Balaji Krishnamachari-Sampath, Sammamish, WA (US); Youssef Maged Barakat, Bothel, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 324 days.

(21) Appl. No.: 15/903,721

(22) Filed: Feb. 23, 2018

(65) Prior Publication Data

US 2019/0018858 A1   Jan. 17, 2019

Related U.S. Application Data

(60) Provisional application No. 62/533,385, filed on Jul. 17, 2017.

(51) Int. Cl.
| | |
|---|---|
| *G06F 7/00* | (2006.01) |
| *G06F 17/00* | (2019.01) |
| *G06F 16/17* | (2019.01) |
| *G06F 8/65* | (2018.01) |
| *G06F 3/06* | (2006.01) |
| *G06F 16/182* | (2019.01) |
| *G06F 16/176* | (2019.01) |
| *G06F 16/18* | (2019.01) |

(52) U.S. Cl.
CPC .......... *G06F 16/1734* (2019.01); *G06F 3/067* (2013.01); *G06F 8/65* (2013.01); *G06F 16/1767* (2019.01); *G06F 16/182* (2019.01); *G06F 16/1873* (2019.01)

(58) Field of Classification Search
CPC ....... G06F 17/30144; G06F 3/067; G06F 8/65
USPC ....................................................... 707/822
See application file for complete search history.

(56) References Cited

U.S. PATENT DOCUMENTS

| | | |
|---|---|---|
| 5,850,522 A | 12/1998 | Wlaschin |
| 7,010,721 B2 | 3/2006 | Vincent |

(Continued)

OTHER PUBLICATIONS

"International Search Report and Written Opinion Issued in PCT Application No. PCT/US2018/034806", dated Aug. 7, 2018, 13 Pages.

(Continued)

*Primary Examiner* — Binh V Ho
(74) *Attorney, Agent, or Firm* — Mannava & Kang, P.C.

(57) ABSTRACT

A system for updating a file and resolving conflict in updating of the file in a distributed file store is disclosed. The system includes a receiver, an updater, and a conflict detector. The receiver receives the file formed of a plurality of extents to be updated. An extent is indicative of a piece of data content of the file and formed of a plurality of packets of substantially equal size. The receiver further receives instructions indicative of one or more extents of the file in which the updates are to be made. The updater updates one or more packets, based on the instructions. The conflict detector detects that a portion of the file is being currently updated, receives a request to update the same portion from another application, and decline the request by the other application to update the same portion to resolve the conflict.

24 Claims, 8 Drawing Sheets

(56) References Cited

U.S. PATENT DOCUMENTS

| | | | |
|---|---|---|---|
| 7,107,419 B1 | 9/2006 | Ghemawat et al. | |
| 7,571,215 B2* | 8/2009 | Jacobs | H04L 29/06 709/203 |
| 8,554,762 B1* | 10/2013 | O'Neill | G06F 16/245 707/715 |
| 8,615,485 B2 | 12/2013 | Yonatan et al. | |
| 8,972,337 B1* | 3/2015 | Gupta | G06F 16/221 707/602 |
| 9,323,775 B2 | 4/2016 | Srivas et al. | |
| 9,460,147 B1 | 10/2016 | Chang et al. | |
| 9,678,969 B2 | 6/2017 | Deng et al. | |
| 10,261,708 B1* | 4/2019 | Ippatapu | G06F 3/065 |
| 2006/0161516 A1* | 7/2006 | Clarke | G06Q 10/10 |
| 2007/0269191 A1* | 11/2007 | Dono | H04N 9/8042 386/239 |
| 2007/0299882 A1* | 12/2007 | Padgett | G06F 16/178 |
| 2011/0113304 A1* | 5/2011 | Heinrich | H03M 13/6343 714/763 |
| 2011/0167239 A1* | 7/2011 | Horn | G06F 16/17 711/171 |
| 2011/0238906 A1* | 9/2011 | Amir | G11B 27/328 711/111 |
| 2013/0311421 A1* | 11/2013 | Erdogan | G06F 16/273 707/609 |
| 2014/0214767 A1* | 7/2014 | Graefe | G06F 11/1451 707/645 |
| 2014/0281249 A1* | 9/2014 | Waldspurger | G06F 12/0802 711/129 |
| 2015/0180905 A1* | 6/2015 | Ruppin | H04L 63/10 726/1 |
| 2015/0212754 A1* | 7/2015 | Kasper | G06F 3/0689 711/114 |
| 2015/0269032 A1* | 9/2015 | Muthyala | G06F 3/0607 707/639 |
| 2016/0034549 A1* | 2/2016 | Kesselman | G06F 16/2228 707/626 |
| 2016/0173394 A1* | 6/2016 | Harvell | H04L 47/25 709/203 |
| 2016/0274980 A1* | 9/2016 | Kim | G06F 11/1453 |
| 2017/0177599 A1 | 6/2017 | Jain et al. | |
| 2017/0371547 A1* | 12/2017 | Fruchtman | G06F 11/1448 |

OTHER PUBLICATIONS

Sadoghi, et al., "L-Store: A Real-time OLTP and OLAP system", In Journal of Computing Research Repository, Jan. 2016, pp. 1-22.

"Net losses: Estimating the global cost of cybercrime", Retrieved From <<https://www.google.co.in/url?sa=t&rct=j&q=&esrc=s&source=web&cd=1&cad=rja&uact=8&ved=0ahUKEwiktKzll4bVAhWJLo8KHbsjBTcQFggqMAA&url=https%3A%2F%2Fwww.mcafee.com%2Fde%2Fresources%2Freports%2Frp-economic-impact-cybercrime2.pdf&usg=AFQCNEqixQFBIXg2ppmN51UD44-j0yLpA>>, Jun. 2014, pp. 1-24.

Mici, Jona, "Buy, buy, baby: The rise of an electronic marketplace for online ads is reshapping the media business", Retrieved From <<https://www.economist.com/news/special-report/21615872-rise-electronic-marketplace-online-ads-reshaping-media-business-buy>>, Sep. 13, 2014, 6 Pages.

Ailamaki, et al., "Weaving relations for cache performance", In Proceedings of the 27th International Conference on Very Large Data Bases, Sep. 11, 2001, 12 Pages.

Alagiannis, et al., "H2O: a hands-free adaptive store", In Proceedings of the ACM SIGMOD International Conference on Management of Data, Jun. 22, 2014, pp. 1103-1114.

Arulraj, et al., "Bridging the archipelago between row-stores and column-stores for hybrid workloads", In Proceedings of the International Conference on Management of Data, Jun. 26, 2016, pp. 583-598.

Barber, et al., "Evolving databases for new-gen big data applications", In Proceedings of 8th Biennial Conference on Innovative Data Systems Research, Jan. 8, 2017, 8 Pages.

Boncz, et al., "MonetDB/X100: Hyper-pipelining query execution", In Proceedings of 2nd Biennial Conference on Innovative Data Systems Research, Jan. 4, 2005, 13 Pages.

Chen, et al., "Providing scalable database services on the cloud", In Proceedings of the 11th international conference on Web information systems engineering, Dec. 12, 2010, pp. 1-19.

Diaconu, et al., "Hekaton: SQL server's memory-optimized OLTP engine", In Proceedings of the ACM SIGMOD International Conference on Management of Data, Jun. 22, 2013, pp. 1243-1254.

Erling, Orri, "Virtuoso, a hybrid RDBMS/graph column store", In Proceedings of IEEE Computer Society Technical Committee on Data Engineering, vol. 35, Issue 1, Mar. 2012, pp. 3-8.

Farber, et al., "The SAP HANA database—an architecture overview", In Proceedings of IEEE Computer Society Technical Committee on Data Engineering, vol. 35, Issue 1, Mar. 2012, pp. 1-6.

Kallman, et al., "H-store: a high-performance, distributed main memory transaction processing system", In Proceedings of the VLDB Endowment, vol. 1, Issue 2, Aug. 23, 2008, pp. 1496-1499.

Kemper, et al., "HyPer: A hybrid OLTP&OLAP main memory database system based on virtual memory snapshots", In Proceedings of the IEEE 27th International Conference on Data Engineering, Apr. 11, 2011, pp. 195-206.

Kim, Larry, "How Many Ads Does Google Serve in a Day?", Retrieved From <<http://www.business2community.com/online-marketing/how-many-ads-does-google-serve-in-a-day-0322253>>, Nov. 2, 2012, 4 Pages.

Krueger, et al., "Fast updates on read-optimized databases using multi-core CPUs", In Proceedings of Very Large Data Bases Endowment, vol. 5, Issue 1, Sep. 2011, pp. 61-72.

Lahiri, et al., "Oracle database in-memory: A dual format in-memory database", In Proceedings of IEEE 31st International Conference on Data Engineering, Apr. 13, 2015, pp. 1253-1258.

Lang, et al., "Data blocks: Hybrid OLTP and OLAP on compressed storage using both vectorization and compilation", In Proceedings of International Conference on Management of Data, Jun. 26, 2016, pp. 311-326.

Larson, et al., "Real-time analytical processing with SQL server", In Proceedings of the 41st International Conference on Very Large Data Bases, vol. 8, Issue 12, Aug. 2015, pp. 1740-1751.

Larson, et al., "High-performance concurrency control mechanisms for main-memory databases", In Proceedings of Very Large Data Bases Endowment, vol. 5, Issue 4, Dec. 2011, pp. 298-309.

Larson, et al., "SQL Server column store indexes", In Proceedings of ACM SIGMOD International Conference on Management of Data, Jun. 12, 2011, pp. 1177-1184.

Levandoski, et al., "The Bw-Tree: A B-tree for new hardware platforms", In Proceedings of IEEE International Conference on Data Engineering, Apr. 8, 2013, 12 Pages.

Lindstrom, et al., "IBM solidDB: In-memory database optimized for extreme speed and availability", In Journal of IEEE Data Engineering Bulletin, vol. 36, Issue 2, Jun. 2013, pp. 14-20.

Makreshanski, et al., "BatchDB: Efficient isolated execution of hybrid OLTP+OLAP workloads for interactive applications", In Proceedings of ACM International Conference on Management of Data, May 14, 2017, pp. 37-50.

Mohan, et al., "Aries: A transaction recovery method supporting fine-granularity locking and partial rollbacks using write-ahead logging", In Journal of ACM Transactions on Database Systems, vol. 17, Issue 1, Mar. 1992, pp. 94-162.

Mohan, et al., "Efficient and flexible methods for transient versioning of records to avoid locking by read-only transactions", In Proceedings of ACM SIGMOD International Conference on Management of Data, Jun. 2, 1992, pp. 124-133.

Neumann, et al., "Fast serializable multi-version concurrency control for main-memory database systems", In Proceedings of ACM SIGMOD International Conference on Management of Data, May 31, 2015, pp. 677-689.

Rajamani, Ravi, "Oracle Total Recall/Flashback Data Archive", In Oracle White Paper, Jun. 2007, pp. 1-10.

Paterson, Ken, "Credit Card Issuer Fraud Management", Retrieved From <<https://issasad.org/wp-content/uploads/2014/10/mercator-fraud-1208.pdf>>, Dec. 2008, pp. 1-13.

(56) References Cited

OTHER PUBLICATIONS

Plattner, Hasso, "The impact of columnar in-memory databases on enterprise systems: Implications of eliminating transaction-maintained aggregates", In Proceedings of the VLDB Endowment, vol. 7, No. 13, Aug. 2014, pp. 1722-1729.

Raman, et al., "DB2 with BLU acceleration: So much more than just a column store", In Proceedings of the VLDB Endowment, vol. 6, Issue 11, Aug. 26, 2013, 12 Pages.

Ramnarayan, et al., "Snappydata: A hybrid system for transactions, analytics, and streaming: Demo", In Proceedings of the 10th ACM International Conference on Distributed and Event-based Systems, Jun. 20, 2016, pp. 372-373.

Sadoghi, et al., "Reducing database locking contention through multi-version concurrency", In Proceedings of the VLDB Endowment, vol. 7, No. 13, Sep. 1, 2014, pp. 1331-1342.

Sadoghi, et al., "Making updates disk-I/O friendly using SSDs", In Proceedings of the VLDB Endowment, vol. 6, No. 11, Aug. 26, 2013, pp. 997-1008.

Sadoghi, et al., "Exploiting SSDs in operational multiversion databases", In International Journal on Very Large Data Bases, vol. 25, Issue 5, Oct. 2016, 22 Pages.

Sikka, et al., "Efficient transaction processing in SAP HANA database: The end of a column store myth", In Proceedings of the ACM SIGMOD International Conference on Management of Data, May 20, 2012, pp. 731-741.

Stonebraker, et al., "C-store: A column-oriented DBMS", In Proceedings of the 31st international conference on Very large data bases, Aug. 30, 2005, 12 Pages.

Stonebraker, et al., "One Size Fits All": An Idea Whose Time Has Come and Gone, In Proceedings of the 21st International Conference on Data Engineering, Apr. 5, 2005, 10 Pages.

Stonebraker, et al., "The VoltDB Main Memory DBMS", In Journal of IEEE Computer Society Technical Committee on Data Engineering, vol. 36, No. 2, Jun. 2013, pp. 21-27.

Ramakrishnan, et al., "Azure Data Lake Store: A Hyperscale Distributed File Service for Big Data Analytics", In Proceedings of the ACM International Conference on Management of Data, May 14, 2017, pp. 51-63.

Cao, et al., "E52: A cloud data storage system for supporting both OLTP and OLAP", In Proceedings of IEEE 27th International Conference on Data Engineering, Apr. 11, 2011, 12 Pages.

\* cited by examiner

UPDATEABLE DISTRIBUTED FILE FRAMEWORK

CLAIM FOR PRIORITY

The present application claims the benefit of priority to U.S. Provisional Application Ser. No. 62/533,385 having the title "UPDATEABLE HYPERSCALE DISTRIBUTED FILE SYSTEM," filed on Jul. 17, 2017, the disclosure of which is hereby incorporated by reference in its entirety.

TECHNICAL FIELD

The present disclosure relates to distributed data stores and, in particular, relates to systems and methods for updating data and resolving conflicts in updating of the data in a hyper-scale distributed file framework.

BACKGROUND

In the last few decades, with the advent of technology, a large amount of data is continuously being generated by various applications. Accordingly, significant research and development have been witnessed in the realm of data stores for storage and management of such data. There are numerous data stores available now that allow businesses and other entities to store structured as well as unstructured data. The data stored in such stores may be used for a variety of applications such as, for example, data analytics.

Nowadays, a number of data stores are implemented as distributed data storage systems. A distributed data storage system enables storing of data across a number of standard servers while functioning as a single storage system. In order to maintain scalability of the distributed data storage systems, files in the storage systems are configured as append-only. Such files can also not be modified once uploaded on to the distributed data storage system.

Further, current distributed data storage systems offer a block-based extraction of the files. In such systems, a file is disintegrated in blocks of a fixed size. For example, a file may be formed of a number of blocks of 256 Megabytes (MB). In order to update the file formed of blocks, a block indicating a portion of the file to be updated may be identified. Subsequently, the identified block may be first updated, and the updated block may then replace the identified block to update the file. Such a file update mechanism may suffer from certain technical limitations. One such limitation is that an update to a small portion of a block may require rewriting the entire block. For example, in order to make a change to 1 MB of a 256 MB block, the system may have to read and then update all 256 MB for updating the file. Therefore, a distributed data storage system may read all 256 MB and then replace the entire original block of 256 MB with the updated block even for a small change in only 1 MB. Further, a distributed data storage system operating based on block-type structure of files stored therein may not offer extraction of only the updated portion of the file. This may result in an insufficient use of system resources, such as CPU cycles and memory, caused by extracting files large files.

In some cases, multiple applications attempt to access the same portion of the file for updating. The file may be locked in such overlapping situations in order to avoid the conflict. Conventionally, the file has to be locked in order to ensure that other applications do not overwrite or corrupt the file. However, with regard to distributed cloud-based data storage systems, this solution may not be scalable.

In addition, in a typical data storage system, when a subsequent transaction attempt is made after a first transaction, the system may be sophisticated enough to allow the second transaction to commit the updates first, rather than failing such commitments right away. In fact, in such cases, the system may impose a commit dependency on the first transaction, i.e., the first transaction becomes a conditional commitment. In other words, even though the second transaction was made after the first transaction, the system allows the second transaction to be committed. But the system may reserve the right to cancel the transaction until the first transaction commitment is successful. If the commitment of the first transaction fails, then the system may also cancel the second transaction, and the first transaction has to be read again for the second transaction to proceed owing to the cancellation.

However, such a transactional scheme may suffer from several limitations in a large distributed computing environment such as the cloud-computing environment. For example, there may be numerous updates being made on large files simultaneously in a cloud-computing environment. In this case, the metadata associated with the updates may become too large for any system to handle.

SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In an example embodiment, a system for updating a file and resolving conflict in updating of the file in a distributed file store is disclosed. The system includes a receiver, an updater in communication with the receiver, and a conflict detector in communication with the receiver and the updater. The receiver is configured to receive the file formed of a plurality of extents to be updated. An extent is indicative of a piece of data content of the file and may be formed of a plurality of packets of substantially equal size. The receiver receives instructions indicative of one or more extents of the file in which the updates are to be made. The updater is configured to update a packet, from among the plurality of packets, based on the instructions. The conflict detector is configured to detect that a portion of the file is being currently updated by an application and may receive a request to update the same portion of the file from another application. The portion is indicative of one of a packet and an extent. The conflict detector is further configured to identify the detection and the receipt as a conflict, and decline the request by the other application to update the same portion to resolve the conflict.

In another example embodiment, a system for updating a file and resolving conflict in updating of the file in a distributed file store includes a receiver, an updater in communication with the receiver, and a conflict detector in communication with the receiver and the updater. The receiver is configured to receive the file formed of a plurality of extents to be updated. The receiver is configured to receive instructions indicative of one or more extents of the file in which the updates are to be made. The updater is configured to disintegrate the one or more extents into a plurality of packets of substantially equal size. The size of the plurality of packets may be determined based on performance results, a size of the file, and/or usage patterns of the file. The updater is configured to update one or more packets, from among the plurality of packets, based on the instructions. The conflict detector is configured to detect that a packet or an extent of the file is being currently updated by an application, receive a request to update the same packet of the file from another application, identify the detection and the receipt as a conflict, and decline the request to update the same packet to resolve the conflict.

In yet another example embodiment, a method for updating a file and resolving conflict in updating of the file in a distributed file store is disclosed. The method includes receiving the file to be updated, the file being formed of a plurality of extents. An extent is indicative of a piece of data content of the file and is formed of a plurality of packets of substantially equal size. The method includes receiving instructions indicative of one or more extents of the file in which the updates are to be made. The method includes updating one or more packets, from among the plurality of packets, based on the instructions. The method includes detecting that a portion of the file is being currently updated by an application, wherein the portion is indicative of one of an extent and a packet. The method includes receiving a request to update the same packet of the file from another application, identifying the detection and the receipt as a conflict, and declining the request by the other application to update the same portion to resolve the conflict.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following detailed description, which is to be read in association with the accompanying drawings, in which.

DETAILED DESCRIPTION

Figure 1:
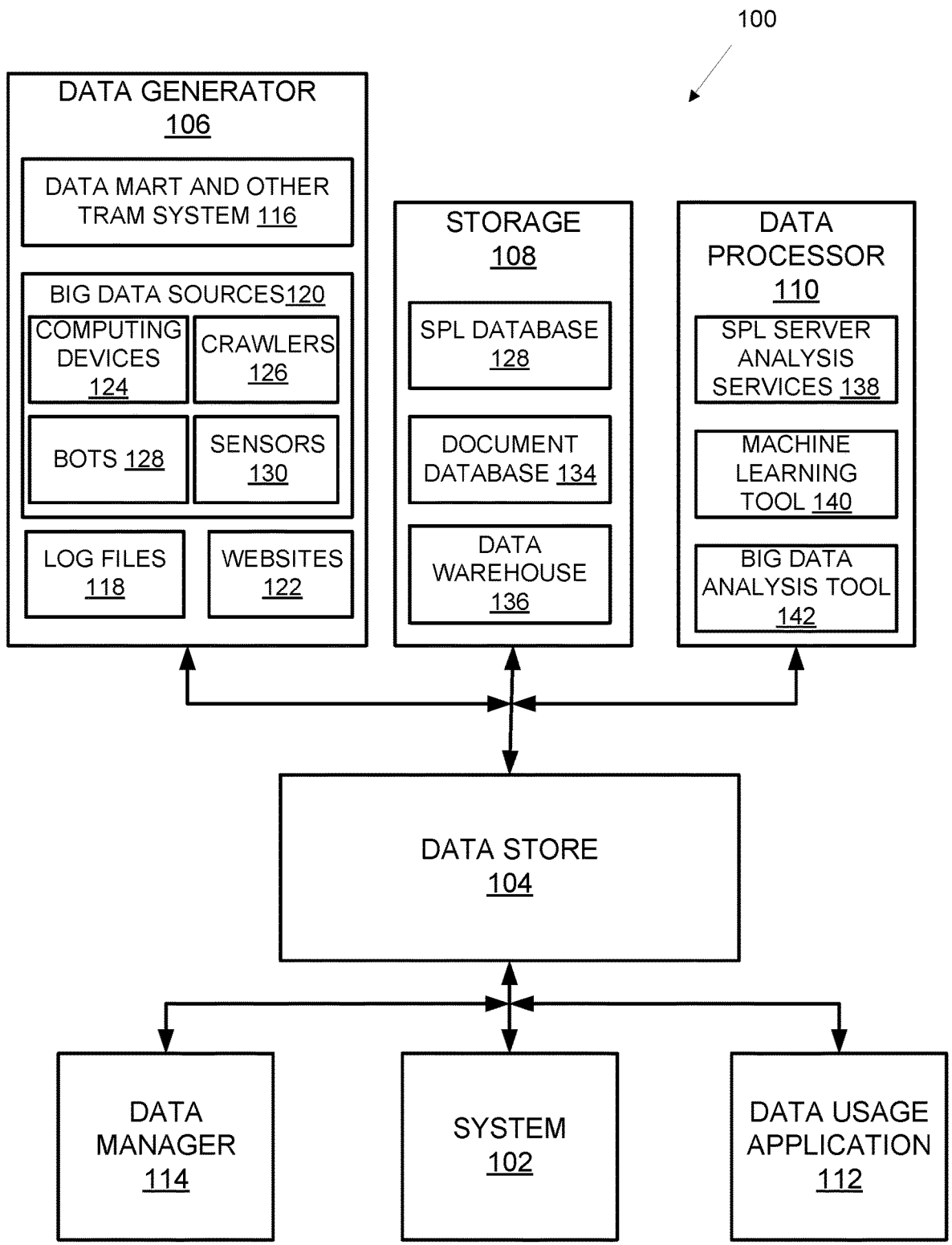
FIG. 1 illustrates an environment for implementation of a system for updating files and resolving conflicts in updating of the files stored in a distributed file framework, according to an example embodiment of the present disclosure.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in an example," as used herein does not necessarily refer to the same embodiment or example, although it may. Use of particular textual numeric designators does not imply the existence of lesser-valued numerical designators. For example, reciting "a widget selected from the group consisting of a third bar and a fourth bar" would not itself imply that there are at least three bar, nor that there are at least four bar elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. In addition, the use of the term "a" or "an" denotes at least one of the term following "a" or "an".

The present subject matter describes one or more systems and methods for updating files and resolving conflicts in updating of the files in a distributed file framework. Although the overview is explained with respect to one of the systems of the present disclosure, the overview is equally applicable to other implementations, without departing from the scope of the present disclosure.

A system is disclosed for updating the files and resolving conflicts in the updating of the files in the distributed file framework. In an example embodiment, the distributed file framework may be a hyper-scale distributed file framework. Specifically, the distributed file framework may be a cloud-based system having multiple servers. The system may allow a user, also referred to as a caller, to dynamically update a file as a file only and not as a block. Therefore, the system may allow the user to update the file on a byte-level granularity. The user may not have to align updates to an entire block of the file, and therefore, may not have to be aware of an internal structure of the file. Instead, the user may open the file for making the updates and write on the file to incorporate such updates. In an example embodiment, the system may also facilitate a user to open the file in any offset and return an offset accordingly.

In order to update the file, the system may opt for an append-only approach. Therefore, the system may enable appending a data stream of the file as well. An update is made to an already existing data block of the file whereas an append may indicate adding new data blocks to the file. For example, the system may update the file through a separate data stream. The system may maintain a separate list of sub-streams or extents. An extent may be understood as a piece of data forming the file. Therefore, a file is formed of a plurality of substantially equally-sized extents. In an example embodiment, each extent may be of 256 Megabytes (MB) and therefore, a file of 1 Gigabytes (GB) may be formed of 4 such extents. In an example embodiment, each extent may further be disintegrated into equally-sized packets of 4 Kilobytes (kB) or 8 kB.

In case where only 1 MB of a file is to be updated, the system may allow updating of 1 MB of the file only rather than the entire 256 MB block. Furthermore, the system may not modify an original version of the file for reflecting the update in the first MB. Rather, the system may store updated bytes of the 1 MB in a new file which may further be read along with the original version of the file for analysis. Therefore, the new file so formed by the system is indicative of the update made by the user. In an example embodiment, the updates may interchangeably be referred to as deltas, without departing from the scope of the present disclosure. Further, the system may store the deltas in separate files known as delta files. Thus, the system may update only the bytes in a file that need updating and read the update in conjunction with the original version of the file.

Furthermore, in order to eliminate a possibility of overlapping between original data and updated data corresponding to a file, the system may use a copy and write mechanism. In particular, the copy and write mechanism may form a connecting link between the original data and the updated data that does not result in any overlapping. In response to a request of an update to the data, the system may copy the data and then read the original data. Once the data is updated, the system may write the update to ensure that there is no overlapping between the original data and the updated data as the updates are always aligned. For example, when an update is formed in the first 1 MB of a 4 MB packet of a file, the system may read all the 4 MB and update the change accordingly. Further, the system may write the update in a delta stream indicative of a data stream of updates in the file. Therefore, the system may write the update made in the 4 MB packet to the delta stream and not only in the 1 MB of data where the update was originally made.

In an example embodiment, because the deltas are being stored in separate files, the system may be able to maintain multiple versions of the file. Therefore, for each update instance, the system may maintain an independent version of the file. Whenever the data of the file is updated, the system may not update the original data. Rather, the system may make a version of the data that is updated, such as the original data, a first version, a second version, and a nth version. Thus, an application may be able to retrieve and read any version of the data.

In the case of multiple applications accessing the same portion of a file, the system may use database-type semantics to detect such a conflict. In an example embodiment, the packets of the file may be represented as a row. When two applications, for example, a first application and a second application, try to access the same row for updating operations, the system may detect the conflict. Further, the system may cancel updating on a row by an application which has not finalized the update yet if the other application has already updated the row.

In an example embodiment, when the update is finalized or committed, the system may monitor or track the commitments. For example, two applications may attempt to access the same packet of the file for updating operations. If the first application commits the update before the second application, the system may transmit a notification to the second application that the packet is not available anymore as it has been updated by the first application. Therefore, the second application may have to read the packet again, which is now updated, before committing another update to the packet.

In an example embodiment, in addition to the update to just one packet, the system may also support multiple transactional updates to the file. The system may detect when a packet of the file is being updated by more than one application for a group of operations. When two applications, for example, a first application and a second application, try to access the same row for updating operations, the system may detect the conflict. Further, the system may cancel updating by an application which has not finalized the update yet, if the other application updated the row before the first application. The system of the present disclosure may not offer dependency tracking or commitment dependency on previous transactions corresponding to updates to the file. The application that commits the updates earlier may be given a success notification by the system. Furthermore, the system may not allow reading of other updates until all the updates are committed.

In an example, an application may attempt to update packets 1, 2, and 3 of the file whereas another application may attempt to update packets 3, 4, and 5. Therefore, both the applications attempt to update the packet 3. The first application may make the changes to the packets 1, 2, and 3 but the changes may not be committed yet. On the other hand, the second application may simultaneously attempt to make changes to the packets 3, 4, and 5. In such cases, the system may keep rights to reserve entry to updates in the packet 3 for the second application until the updates made by the first application to the packet 3 are cleared. In an example embodiment, both the applications may be allowed to proceed to make the update, and the conflict may be resolved at the stage of commitment or finalization of the update. In an alternate example embodiment, the conflict may be resolved at an initial stage itself such as, for example, when the second application attempts to update the packet 3, the second application is initially not allowed to make the update but may be notified when the first application update is completed. In an alternate example embodiment, the conflict may be resolved at an initial stage itself such as, for example, when the second application attempts to update the packet 3, the second application is initially not allowed to make the update but may be notified when the first application update is completed. Thus, in this alternate example embodiment, conditional updates are avoided, and as a result, resolving conflicts for conditional updates is also avoided.

Moreover, the system stores large files in a manner that allows for more efficient reads and writes as compared to existing distributed file frameworks. In an example embodiment, the size of the file to be stored may be 1 Petabyte (PB). A file of such a large size may not be storable on one machine. Therefore, the file may be disintegrated into smaller extents, for example, each of 256 MBs, and then the file may be stored in different sub systems in the form of segregated extents.

Also, considering that a number of updates may be made on a large-sized file, such as the 1 PB file discussed above, the system may use bloom filters to ensure that metadata associated with the updates is not too large for the system to handle. The metadata may include, but is not limited to, a source stream offset and a delta stream offset. The system may retrieve such information, generate corresponding metadata, and turn it into another metadata extent or may store it as a new file or in a cold storage. The system may still maintain some information in the metadata layer indicative of portions of the files that are updated.

The systems and the methods of the present disclosure offer a comprehensive and effective approach for updating the files and resolving the conflicts in updating of the files in a distributed file framework. The system allows for updating the data in the files in a large scale distributed computing environment such as the cloud, while still ensuring scalability and immutability so that operations can be performed unaltered. Further, the user can update the files in a traditional manner without having to replace entire blocks of a file when the changes only need to be made to a very small portion of a block. Because the changes are made on the byte level, the system does not need large data storage space to make a small change in the file.

Simultaneously, the system retains the advantages of high availability and scalability as offered by conventional block-based update techniques. Also, the system ensures that an application will read the data again after updating it and before making any further modifications. This may negate the possibility of data corruption in the files.

Further, the system ensures that the multiple applications can update files conveniently without any conflict. The system also obviates the need to deal with limitations related to commitment dependencies. Moreover, because the delta extents are stored in the same machine as the original data or in a machine in the vicinity of the same machine, the latency related to computing may also be minimized.

The system also offers a simple and user-friendly Application Program Interface (API) for the users to update contents of any existing data stream at any offset. The API is implemented while maintaining the aspects of scalability, performance, and security.

The system of the present disclosure does not require changes to the existing architecture of distributed file frameworks. Therefore, the system offers a comprehensive, convenient, flexible, and effective approach for updating files and resolving the conflicts in updating of the files in the distributed file stores. The system described above may be embodied in system 102 shown in FIGS. 1 and 2, which is described in detail below.

FIG. 1 illustrates an environment 100 for implementation of a system 102 for updating content of files stored in a data store 104, according to an example embodiment of the present disclosure. In an example embodiment, the system 102 may append content to the files as well, without departing from the scope of the present disclosure. In an example embodiment, the data store 104 may be understood as a hyper-scale repository for big data analytics workloads and a distributed file framework for the cloud. Therefore, the data store 104 may be an enterprise wide repository for collecting data.

In an example embodiment, the data store 104 may be in communication with the system 102, a data generator 106, storage 108, a data processor 110, data usage applications 112, and a data manager 114. The data generator 106 may generate data, for example in the form of files, to be stored in the data store 104. The data generator 106 may include, but is not limited to, DataMart and other transactional systems 116, log files 118, big data sources 120, and websites 122 linked with the data store 104. The big data sources 120 may further include, but are not limited to, computing devices 124, crawlers 126, bots 128, and sensors 130. The computing devices 124, the crawlers 126, the bots 128, and the sensors 130 may be installed in or belong to any industry, without departing from the scope of the present disclosure.

In an example embodiment, the storage 108 may be configured to store data pertaining to the data store 104. The storage 108 may include, but is not limited to, a Structured Query Language (SQL) database 132, a document database 134, and a data warehouse 136. In an example embodiment, the SQL based database 132 may store SQL based data of the data store 104. Further, the document database 134 may be configured to store data pertaining to documents received from the data generator 106. The remaining data or the data which is not being used at a given point in time may be stored in the data warehouse 136.

Further, the data processor 110 may be configured to process the data stored in the storage 108 for analytics operations or any other operation. The data processor 110 may include, but is not limited to, SQL server analysis services 138, a machine learning tool 140, and a big data analysis tool 142. The SQL server analysis services 138, the machine learning tool 140, and the big data analysis tool 142 may process the data, based on instructions received from a user.

In an example embodiment, the user may be able to access the data of the data store 104 through the data usage applications 112. The data usage applications 112 may include, but are not limited to, an Excel-Business Intelligence (BI) tool, a SharePoint-BI tool, and a power-BI tool.

The data manager 114 may include tools for managing data in the data store 104. The tools may be configured to allow the user to read, write, and manage large datasets, transfer large amount of data within the data store 104, and import data to the data store 104. In an example embodiment, the data manager 114 may use data mining techniques for performing operations, such as clustering, regression testing, and statistical modeling.

In an example embodiment, the system 102 may be configured to update the data or the files in the data store 104. The constructional and operational details of the system 102 are explained in the description of FIG. 2.

Figure 2:
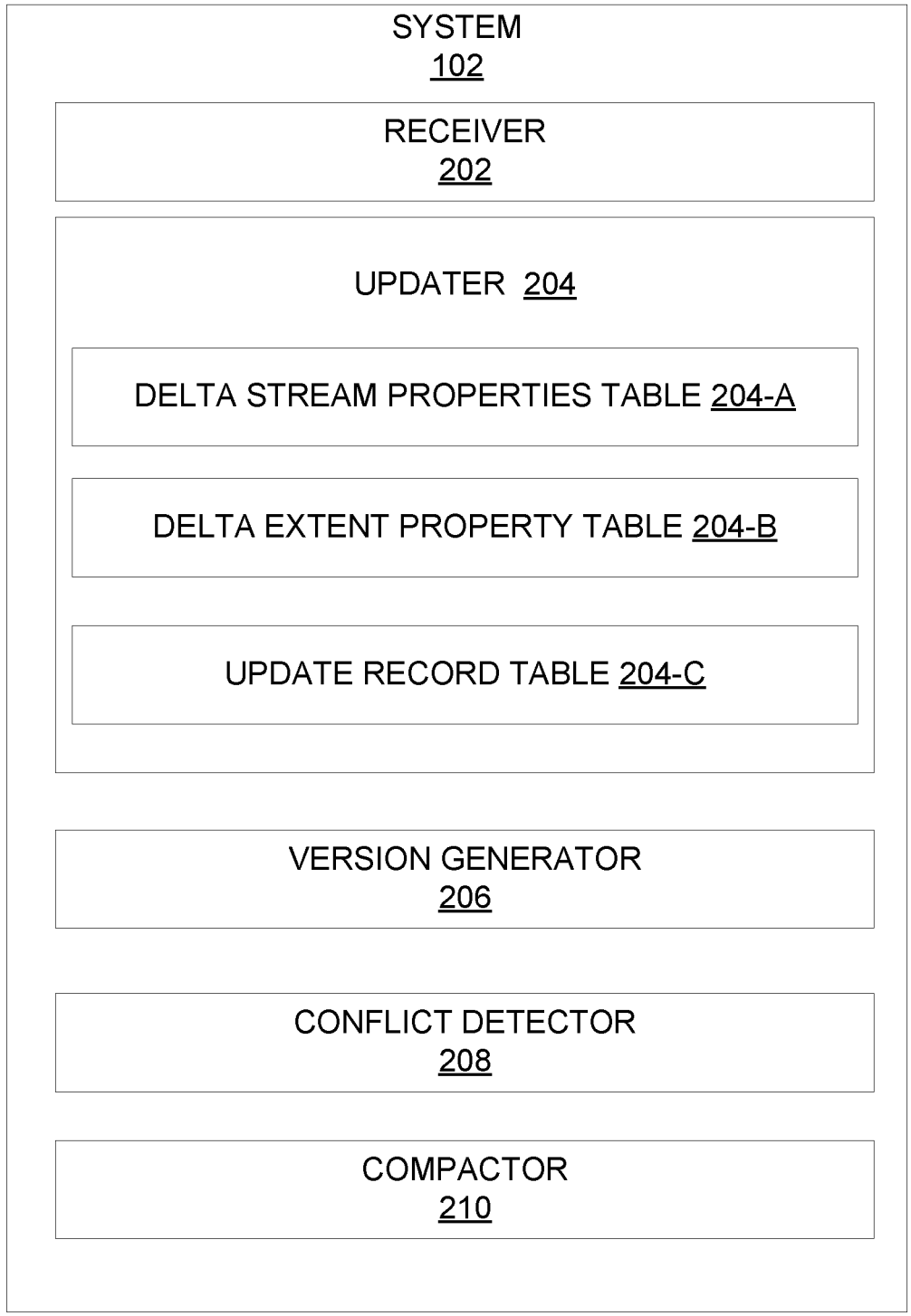
FIG. 2 illustrates a block diagram of the system, according to an example embodiment of the present disclosure.

FIG. 2 illustrates a block diagram of the system 102, according to an example embodiment of the present disclosure. For the sake of brevity, features of the system 102 that are already explained in the description of FIG. 1 are not explained in detail in the description of FIG. 2. The system 102 may include a receiver 202, an updater 204, a version generator 206, a conflict detector 208, and a compactor 210. The receiver 202, the updater 204, the version generator 206, the conflict detector 208, and the compactor 210 may be in communication with each other.

The receiver 202 may be configured to receive a file to be updated from the data store 104. In an example embodiment, the file may be formed of a plurality of extents. Each extent may be understood as a piece of data content of the file. The receiver 202 may further receive inputs indicative of one or more extents in which the updates are to be made. In an example embodiment, the receiver 202 may receive the inputs from the user via a user interface (not shown).

The updater 204 may disintegrate each of the plurality of extents into a plurality of packets of substantially equal size. In an example embodiment, the size of the plurality of packets is determined based on performance results, a size of the file, and usage patterns of the file.

Figure 3:
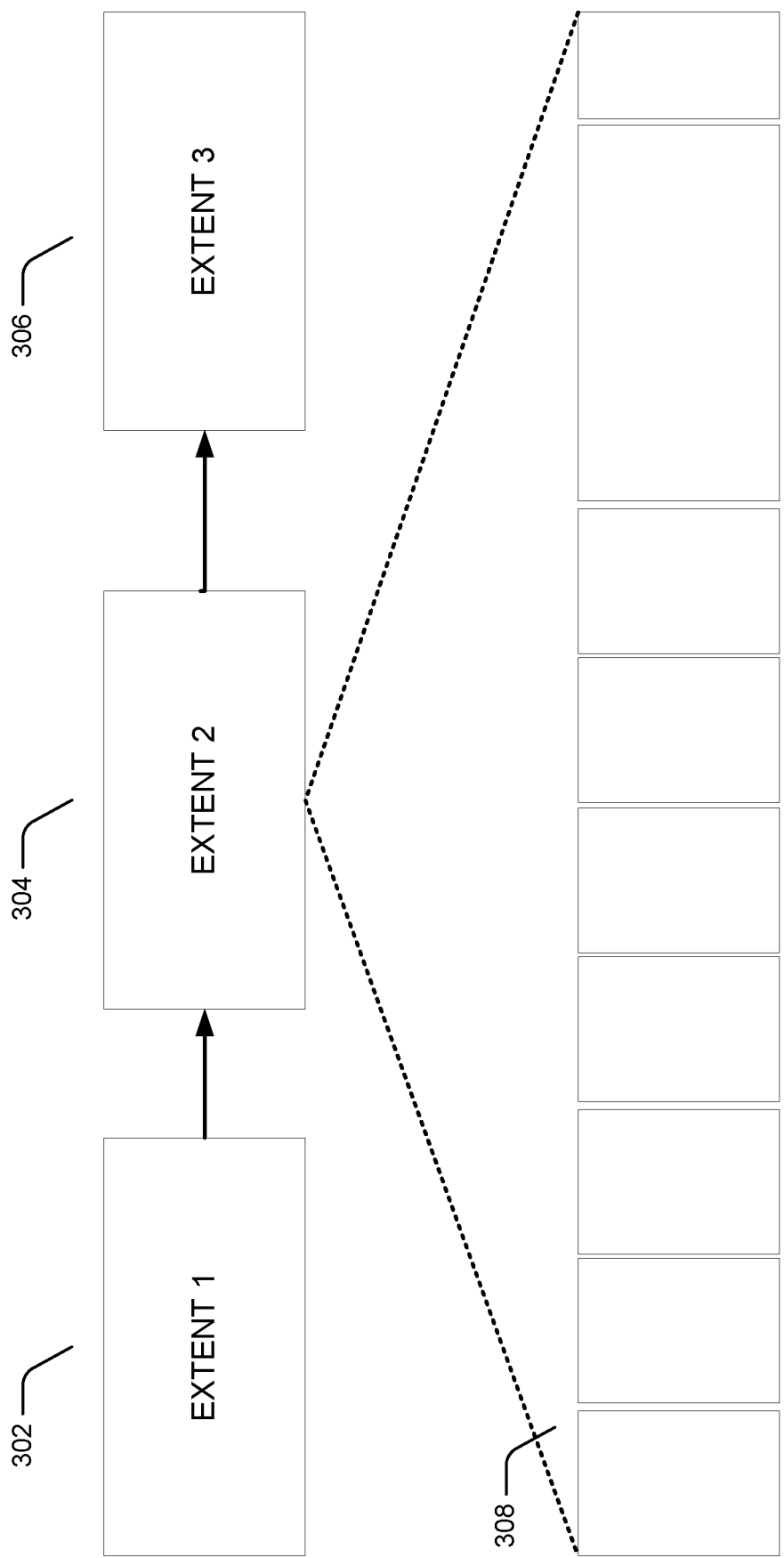
FIG. 3 illustrates a pictorial representation of extents being disintegrated in packets by the system, according to an example embodiment of the present disclosure.

FIG. 3 illustrates a pictorial representation of the extents being disintegrated into packets by the updater 204 of the system 102, according to an example embodiment of the present disclosure. For the sake of brevity, features of the system 102 that are already disclosed in the description of FIG. 1 and FIG. 2 are not explained in detail in the description of FIG. 3. As shown, the file or a data stream of the file may be formed by three extents of substantially equally size, namely an extent 302, an extent 304, and an extent 306. In an example embodiment, the receiver 202 may receive inputs from the user to update a portion of the extent 304 of the file. Therefore, the updater 204 may disintegrate the extent 304 into a plurality of packets 308 of approximately equal size (although the packets 308 may also each have different sizes)

Referring back to FIG. 2, the updater 204 may update one or more packets, from among the plurality of packets, based on the inputs received from the user. The updater 204 may then generate delta packets corresponding to the updates made in the packets. A delta packet may be indicative of a change made in an original packet. The updater 204 may read the packets and the delta packets for analysis of the updated file.

In an example embodiment, the updater 204 may allow the user to open the file at any offset and then update the file using a "write" command. The updater 204 may not allow the user to "insert" the update into the data stream of the file. That is, the updater 204 may not overwrite the existing data stream. Instead, the update is stored in a separate delta stream. Also, upon receipt of a request to delete data the updater 204 may not actually delete the data from the data stream. This is because the deletion of the data may cause additional computing and storage overhead. Rather, the updater may store metadata that indicates that the data to be deleted is unavailable, thereby eliminating the need for additional CPU cycles and storage.

In order to support scalability, the updater 204 may break the extents into smaller packets. In an example embodiment, the size of the packets may be about 8 kB. By breaking the extents into smaller packets, the updater 204 may achieve increased granularity in updating the data in a file, and at the same time limit storage and computing costs associated with the metadata related to tracking the updates in a file. For example, if an update needs to be made from 0 to 20 bytes in a file, the metadata costs associated with tracking such a minor update may be high. On the other hand, if a larger portion of the file such as, for example 256 MB, is taken over to make the update, such a transaction may not be an efficient use of storage space. By breaking the extents into a size smaller than 256 MB and larger than 20 bytes, such as 8 kB, updater 204 achieves a workable balance between ensuring granular updates and limiting overhead costs.

The updater 204 may handle modifications at the extent-level, which may allow some concurrency when readers and writers may attempt to perform updates on different extents of the data stream of the file. The updater 204 may use delta files for storing the updates of the data stream. The updater 204 may maintain a list of the updates in a table without modifying the original data stream. In an example embodiment, the updater 204 may create a new delta block extent that may be linked or associated with the extent of the original stream that is being updated. The updater 204 may similarly maintain a list of all the delta blocks for the file to perform further analysis. Similarly, the updater 204 may generate or maintain a table enlisting appends made to the file.

In an example embodiment, the receiver 202 may receive a request to make another update to the file. In such an example embodiment, the updater 204 may use append-only semantics to append the delta block or the delta packet instead of updating the original extent or an original version of an extent of the file. The appends being made to the delta blocks may not block the users from accessing the file.

In an example embodiment, the updater 204 may store the delta blocks for the data stream in a single data stream. Therefore, the updater 204 may store all the updates made to the original stream in a delta block stream. In the present example embodiment, the updater 204 may store the updates in support with the tiered store infrastructure. The delta blocks may be stored in the delta stream and may be read when the user may request to read the data stream.

In an example embodiment, the updater 204 may store the delta block in an extent placed closer to the original extent. In an example embodiment, the updater 204 may store the updates of an extent in the same extent only. In another example embodiment, the updater 204 may store the deltas of M extents in a single delta extent. A value of M may be between 1 and a number of extents N in the data stream of the file. In an example embodiment, the value of M may be determined based on performance testing and positioning of the extents in nodes of the source data stream.

When the delta blocks are stored in close proximity to the original extent, a cost of reading of the data stream may be significantly less since the original data and the corresponding delta blocks are closer to each other.

In an example embodiment, the delta block may be affinitized to the original block and therefore may have a 1:1 correspondence with the original block; however, this may increase metadata. Rather, the system may select M:1 scheme so that affinity is not lost and the metadata is not significantly increased. Further, the delta blocks may not be stored in a scattered manner as there may be a M:1 correspondence with the original set of extents. For example, a delta extent may store the updates for extents E1, E2, E3, E4, and E5. The extents E1, E2, E3, E4, and E5 may be stored close to each other. This would reduce a possibility of scattered positioning of the updates as the delta extent may maintain the updates for a smaller set of extents (M) and not for all the extents present in the data stream.

In distributed data stores, more than 95% of the data streams may include one extent stream. The updater 204 may store the delta extents for different source streams in a single delta stream, i.e., a delta stream with n delta extents maintaining the deltas of extents present in different data streams.

Figure 4:
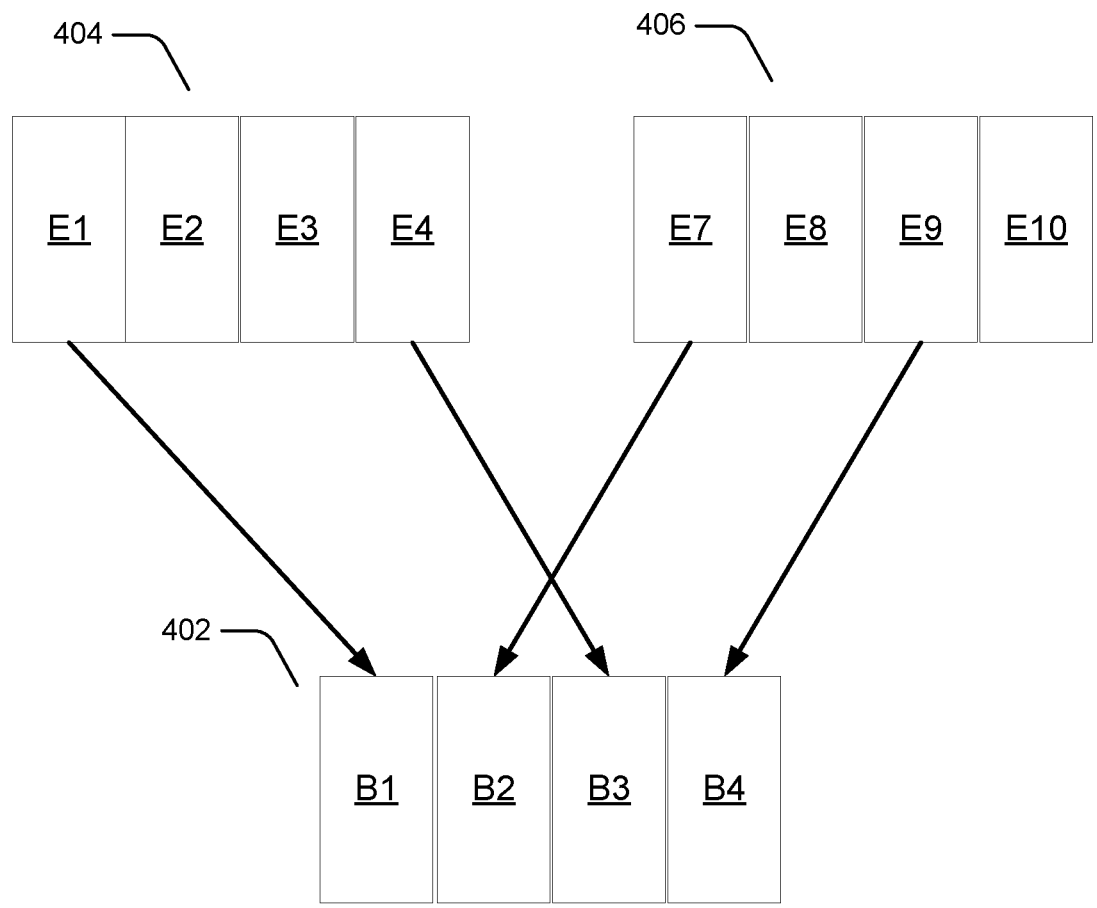
FIG. 4 illustrates a pictorial representation of formation of a delta stream from multiple data streams, according to an example embodiment of the present disclosure.

FIG. 4 illustrates a pictorial representation of the formation of a delta stream 402 from multiple data streams 404 and 406 according to an example embodiment of the present disclosure. For the sake of brevity, features of the system 102 that are already explained in the description of FIG. 1, FIG. 2, and FIG. 3 are not explained in detail in the description of FIG. 4.

As shown, there are two data streams 404 and 406 The data stream 404 may include extents E1, E2, E3, and E4 whereas the data stream 406 may include extents E7 E8, E9, and E10. The updater 204 may update the extents of 404 and 406 and form the delta stream 402 having delta extents B1, B2, B3, and B4.

In an example embodiment, the updater 204 may make updates at packet-size granularity, where each packet may be 4 kB or 8 kB. Any update may need to read the corresponding packet into memory, make the update, and append the update to the delta file. In an example embodiment, in order to update the $10^{th}$ byte or $20^{th}$ byte of the file, the system may take ownership of a packet of size 4 kB or 8 kB. The embodiments described herein may make it easier or faster to read the data as compared to applying the updates across all the data streams.

The update may be aligned with the 4 kB or 8 kB packet. The system may write a 4 kB or 8 kB packet to the delta stream and not just the $10^{th}$ byte or $20^{th}$ byte with modifications. Therefore, the system may take ownership of the fixed size packet to accommodate the change in any of the portions of the packet. This may alleviate concerns related with merging a number of deltas present in the same portions of the file. For example, bytes 10-20 may have a delta. Similarly, bytes 100-200 and bytes 400-500 may have their respective deltas. By taking ownership of the 8 kB block, the system may generate 3 delta blocks for 0-8 kB, and a delta block version as requested by the user may be used. In an example embodiment, the size of the packet may be configurable, for example, based on the update being made. The system 102 may be implemented using Solid State Drives (SSD). The SSD may eliminate the searching process and allow for faster reading.

In an example embodiment, the updater 204 may maintain a delta stream properties table 204-A, a delta extent properties table 204-B, and an update record table 204-C. The delta stream properties table 204-A may be indicative of the delta streams available in the data store 104. The delta stream properties table 204-A may include, but is not limited to, a name, a type, and a description of the delta streams. In an example embodiment, the delta steam properties table 204-A may be used for storing the updates for any of the data streams.

Table 1 illustrates an exemplary delta stream properties table 204-A as maintained by the updater 204. Table 1 is shown for providing a better clarity and understanding of the subject matter and should not be construed as limiting.

TABLE 1

| Name | Type | Description |
| --- | --- | --- |
| RecordId | Guid | Unique record id |
| UpdatableProviderStreamId | Guid | Updatable provider stream id |
| DeltaStreamId | Guid | Delta Stream id |
| CreationTime | UInt64 | Creation time of the entry |
| IsActive | Bit | Is this the active stream |
| shouldScheduleCompaction | Bit | Should schedule compaction |
| MinCompactionScheduleTime | UInt64 | Schedule the compaction after the specified time |

The delta extent properties table 204-B may be indicative of the delta extents corresponding to the updates. The delta extent properties table 204-B may include, but is not limited to, a column name, a type, and a description of the delta extents. In an example embodiment, the delta extent properties table 204-B may be used for the list of extents in a data stream containing the updates.

Table 2 illustrates an exemplary delta extent properties table 204-B as maintained by the updater 204. Table 2 is shown to provide better clarity and understanding of the subject matter and should not be construed as limiting.

TABLE 2

| Column Name | Type | Description |
| --- | --- | --- |
| RecordId | Guid | Record id |
| UpdatableProviderStreamId | Guid | Updatable provider stream id |
| SourceExtentId | Guid | Source extent id |
| ExtentIndexInStream | UInt64 | SourceExtentIndex |
| DeltaStreamId | Guid | Stream id of the delta stream |
| DeltaExtentId | Guid | Extent id containing the updates |
| DeltaExtentChanges | UInt64 (nullable) | 64 bit vector to represent the changes in Extent. |

In an example embodiment, a stream S1 may include extents E1, E2, . . . E10, where the extents E1 and E5 correspond to updates. In such an example embodiment, the delta extent properties table 204-B may be as shown in table 3. Table 3 illustrates an exemplary delta extent properties table as maintained by the updater 204. Table 3 is shown to provide better clarity and understanding of the subject matter and should not be construed as limiting.

TABLE 3

| Provider Stream Id | Extent Id | Extent Index | Delta Stream Id | Delta Extent Id | Delta Extent Changes |
| --- | --- | --- | --- | --- | --- |
| {S1 StreamId} | E1 | 0 | DS1 | B1 | 110000 . . . 000 |
| S1 | E5 | 4 | DS1 | B5 | 0001100 . . . 01 |
| . . . | | | | | |

As shown in table 3, bit vectors (depicted in the last column under "Delta Extent Changes") may act like a bloom filter and represent the sections of the extents modified. A bit vector is a list of bits that is used to indicate the location of changes in an extent. By reviewing the location of the bits in a bit vector, a system may determine what portion of an extent has changed. A bloom filter may be understood as a space-efficient probabilistic data structure that is used to test whether an element is a member of a set. In the present example embodiment, the bloom filters may be used to determine which portion of an extent is updated. For example, an extent of 512 MB may be formed of 64 portions of 4 MB each. A bit vector of the extent may include 64 numerical values, where each numerical value may indicate an update status of a portion of the extent. Further, a numerical value "1" may indicate an update in a corresponding portion. For example, if the filter value of the extent E1 is 100000 . . . 000, this may indicate that either portions 252-256 MB or 508-512 MB in the extent E1 have updates.

Further, the update record table 204-C may be indicative of updates made to different extents of the data stream. The update record table may include, but is not limited to, a name, a type, and a description of the updates. The update record table may be used to get a list of updates for a given extent of the data stream.

Table 4 illustrates an exemplary update record table 204-C as maintained by the updater 204. Table 4 is shown for providing a better clarity and understanding of the subject matter and should not be construed as limiting.

TABLE 4

| Name | Type | Description |
| --- | --- | --- |
| RecordId | Guid | Unique record id |
| SourceExtentIdAlias | UInt64 | Alias for the Source extent id. This alias id represents an extent in a stream at an index. |
| StartRelativeOffsetInExtent | Uint32 | Start Relative offset in the source extent (8K aligned) |
| EndRelativeOffsetInExtent | UInt32 | End Relative offset in source extent (8K aligned) |
| ActualLength | UInt32 (nullable) | Represents actual length owned. (Extent might not have 8K aligned bytes at the end.) |
| DeltaStreamId | GUID | Stream id of the delta stream containing the updates |
| DeltaExtentId | GUID | Extent id of the delta stream containing the updates |
| DeltaExtentOffset | Uint32 | Extent offset |
| UpdateTime | Uint64 | Update time |
| StreamUpdateVersion | UInt64 | Update Version |
| TransactionId | GUID | Ongoing Transaction id (will be empty guid after transaction commits) |

In an example embodiment, the updater 204 may commit the updates in a transactional fashion for a set of files. For example, the user may commit a first set of updates for a first file in a first transaction "t1" and may commit a second set of updates for a second file in a second transaction "t2". Therefore, the user may simultaneously commit the first transaction "t1" and the second transaction "t2" as an atomic unit.

In particular, the updater 204 may initiate the first set of updates for the first file in the first transaction "t1". The transaction "t1" may be active with the first set of updates. The first set of updates may not be visible unless committed. Further, the updater 204 may initiate the second set of updates for the second file in the second transaction "t2". The second transaction "t2" may be active with the second set of updates. The second set of updates may not be visible unless committed. In one embodiment, the updater 204 may initiate the first set of updates and the second set of updates, based on user instructions.

The user may then call "PrepareCommit(t1, t2)", and the updater 204 may prepare the commit the first set of updates along with the second set of updates for both the transactions. In one embodiment, an updateability store may prepare the commit. The updater 204 may perform validations and return an "id tx". The user may then call "CompleteCommit(tx)" to commit the first transaction "t1" and the second transaction "t2" as the atomic unit. Once committed, the updates made to the first file and the second file may be visible to other threads. This may be beneficial in scenarios where a set of related files are to be updated in an atomic manner to maintain consistency.

In an example embodiment, the system 102 may store a large sized file across multiple machines. For example, the size of the file may be 1 PB. A file of this size may not be stored in one machine. Therefore, such files may be stored in the form of disintegrated portions of data across multiple machines. In an example embodiment, the updater 102 may update a portion of the large sized data that is stored in a first machine. The updater 102 may then generate a delta extent corresponding to the update made. The updater 102 may store the delta extent either in the first machine or in any other machine placed in proximity of the first machine. The updater 204 may identify other machines in proximity of the first machine, based on a network map of machines associated with the system 102. The network map may be indicative of at least one of locations, operational statuses, and space available in each of the machines. The updater 204 may then select the other machine, based on the location, the operational status and the space available in the other machine.

For example, 1 GB of data may be stored in a number of machines, namely machine 1, machine 3, machine 5, and machine 7. A change may be made in the first MB of the data which is in machine 1. The updater 204 may create a delta extent corresponding to the update. The updater 204 may not place the delta extent in any random machine. In an example embodiment, the updater 204 may try to place the delta extent either in machine 1 or in another machine in the vicinity or proximity of machine 1, based on the network map.

In an example embodiment, multiple applications may attempt to access the same portion of the file. The conflict detector 208 may detect such an event where the multiple applications are attempting to access the same portion of the file. When two applications, for example, a first application and a second application, try to access the same row for updating operations, the conflict detector 208 may detect the conflict.

In other words, the conflict detector 208 may detect that a portion of the file is being currently updated by an application. The portion is indicative of a packet or an extent. Simultaneously, the updater 204 may receive a request from another application to update the same portion. The conflict detector 208 may identify the detection and the receipt as a conflict. The conflict detector 208 may decline the request to update the same portion, thereby resolving the conflict.

In an example embodiment, if an update is being made on a version 4 of a file and a request for another update is received, the conflict detector 208 may restrict the new update to be made on version 4. Rather, the new update may now be made to a version 5 of the file. Further, the conflict detector 208 may detect the conflicts during a commit phase of the update, i.e., when the update has to be submitted.

In an example embodiment, when the update is finalized or committed, the conflict detector 208 may monitor or track such commitments. In an example embodiment, the conflict detector 208 may maintain an in-progress update tracker table. The in-progress update tracker table may be indicative of in-progress updates and resolved conflicts either at the stream level or at the packet level. In an example, the conflict detector 208 may resolve the conflict at the packet level. Therefore, if the conflict detector 208 detects in-progress updates for a packet, i.e., the packet is being presently updated, then the conflict detector 208 may decline another request for an update to the same packet.

The in-progress update tracker table may include, but is not limited to, a column name, a type, and a description of the in-progress updates of the packets. Table 5 illustrates an exemplary in-progress update tracker table as maintained by the conflict detector 208. Table 5 is shown for providing a better clarity and understanding of the subject matter and should not be construed as limiting.

TABLE 5

| Column Name | Type | Description |
| --- | --- | --- |
| InProgressUpdRecordId | Guid | In progress record id |
| UpdatableProviderStreamId | Guid | Updatable provider stream id |
| SourceExtentIdAlias | Guid | Source extent id alias. This alias id represents an extent in a stream at an index. |

TABLE 5-continued

| Column Name | Type | Description |
|---|---|---|
| SourceExtentStartOffset | UInt64 | Source extent start offset (8K aligned). This can also use block id instead of offset. |
| PrepareCommitTxnId | GUID | Transaction that added this block to prepare commit state. This field will be an empty Guid if this entry is not prepared. The value will be changed to "tx id" when the transaction is prepared. |
| PrepareCommitTxnTime | UInt64 | Time at which the Txn is added to prepare commit state (useful for garbage collection) |

In an example embodiment, the conflict detector 208 may also detect conflicts with regard to multiple transactional updates to the file. The conflict detector 208 may detect when a packet of the file is updated by more than one application for a group of operations. In an example embodiment, an application may be attempting to update the $1^{st}$ MB, the $10^{th}$ MB, and the $21^{st}$ MB of the packet of the file whereas another application may attempt to update the $1^{st}$ MB, the $11^{th}$ MB, and the $13^{th}$ MB of the same packet of the file. In such cases, the conflict detector 208 may detect the attempts to update the $1^{st}$ MB by both the applications as a conflict. In an example embodiment, the conflict detector 208 may not make the data available to other applications for updates till the application that first began making updates commits all three update operations. Once all three update operations are committed by the application, the update may become visible to other applications. On the other hand, even if an application commits the first update, it may not be considered successful till the application commits all three updates. In other words, success and failure of the transaction may be determined based on commitment of all the update operations.

In an example embodiment, the conflict detector 208 may analyze a variety of situations for detection of the conflict. For example, a read or write request may be received for a packet or an extent which is not yet updated. Therefore, the conflict detector 208 may not detect any conflict. In another example embodiment, an update request may be received for a stream. The conflict detector 208 may determine whether the packet-in-question is already undergoing an update operation and halt the update request is the packet-in-question is already undergoing an update operation.

In another example embodiment, a read request for an extent may be received along with a write request for another extent. In the present example embodiment, the conflict detector 208 may not detect any conflict with regard to either of the extents involved. In an example embodiment, a read request may be received for an extent which has been updated. The conflict detector 208 may retrieve the updated extent in order to respond to the read request. The system 102 may respond to the query with the list of updated extents as well as the original extents. In an example embodiment, two write requests may be received for the same extent. The conflict detector 208 may then detect a conflict as explained above.

In an example embodiment, a read request as well as a write request may be received for the same extent. Because the delta files are generated by the updater 204, the system 102 may not block readers to access the content. Some version of the content may always be available to the user for reading. Since all the write requests append to the delta blocks, the file may be free for readers for existing blocks or packets.

In case of appends, the conflict detector 208 may detect a conflict even if there is a conflict for just a small portion of the file and not for the entire file. Therefore, even though the offset may not match completely, since an append may change the size of the file, the conflict detector 208 may restrict another application to append the file unless the first append is completed and the size of the file is defined. Now, when the other application attempts to append the file, the new size of the file as a consequence of the previous append may be visible.

In an example embodiment, the system 102 may enable maintaining multiple versions corresponding to multiple updates to the file. The version generator 206 may generate one or more versions of the file. Each version may be indicative of a new update made to the packet or the extent of the data stream. Therefore, while reading the data, the user may retrieve that stream update version that corresponds to the data being read by the user. The version generator 206 may assign a version number to a versioned update command that may check if a range being modified has been updated by some other user before committing the write.

For each instance of update, the version generator 206 may generate and maintain a version of the file. Therefore, whenever the data of the file may be updated, the system 102 may not update the original data.

In an example embodiment, the deltas for an extent may be stored in another extent. The compactor 210 may scatter the updates of a contiguous block across the delta extent or multiple delta extents. Due to the scattering of the updates, the compactor 210 may manage the versions of deltas in a delta extent.

Figure 5:
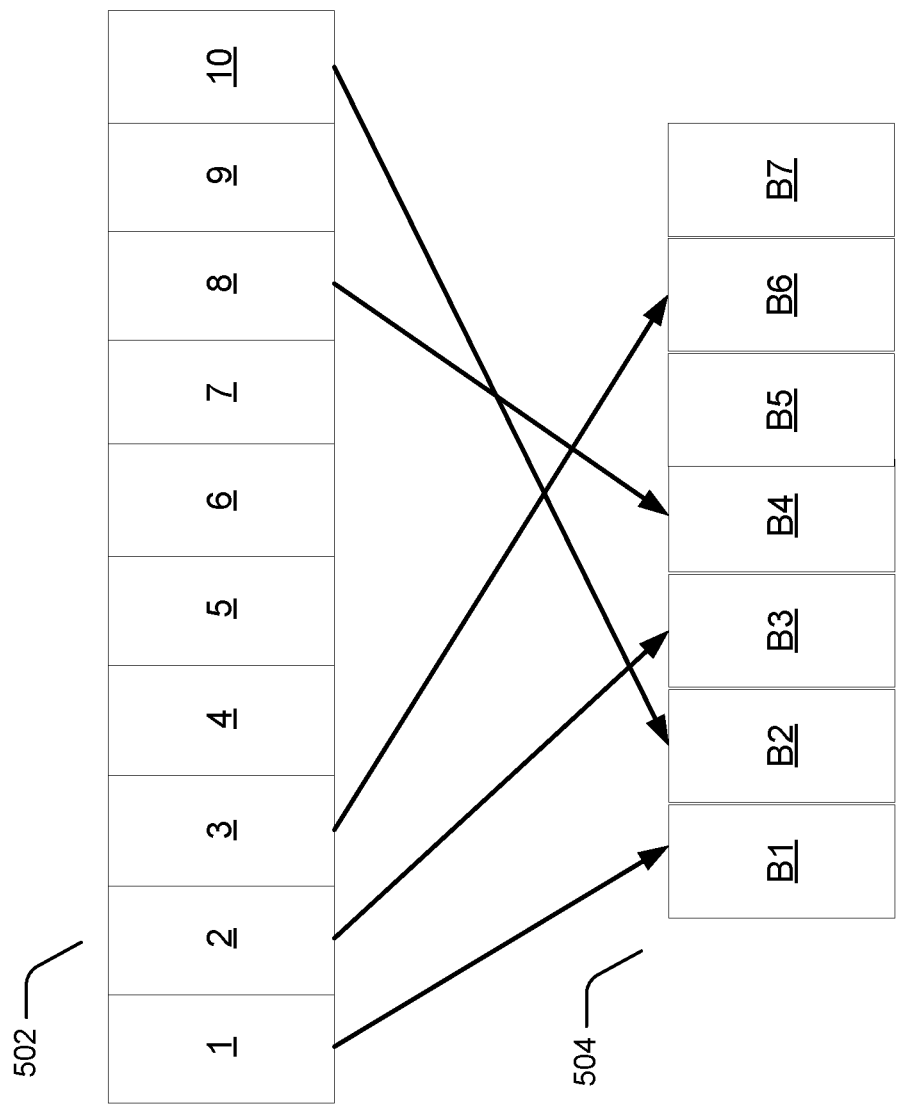
FIG. 5 illustrates a pictorial representation of deltas being scattered across multiple delta extents, and a delta may be indicative of a change in a file and a delta extent may be indicative of a change in an extent of the file, according to an example embodiment of the present disclosure.

FIG. 5 illustrates a pictorial representation of deltas being scattered across multiple delta extents, according to an example embodiment of the present disclosure. For the sake of brevity, features of the invention that are already disclosed in the description of FIG. 1, FIG. 2, FIG. 3, and FIG. 4 are not explained in detail in the description of FIG. 5. As shown, offsets in an original extent 502 are represented by numbers 1 to 10. The spreading of the updates is represented through arrows. In an example embodiment, before an update, a user may perform one I/O operation to read 0-4 MB of a packet. After an update, delta extents 504 B1, B3, B6 and B4 may need to be read in order to read the 0-4 MB of data.

The compactor 210 may defragment the delta file and remove the stale block versions. The compactor 210 may include a compaction extent finder, which may analyze metadata to find potential delta extents that are fragmented. Further, the compactor 210 may store the potential delta extents, which may be compacted. In an example embodiment, the compactor 210 may defragment the delta extents as well. Once the delta extents are defragmented, the compactor 210 may update the metadata.

The metadata associated with the delta extents may be stored for every 8 kB of data; therefore, the amount of metadata to be maintained may be large. In an example embodiment, the compactor 210 may ensure that metadata associated with the updates is not too large using the methods described below. The metadata may include, but is not limited to, a source stream offset and a delta stream offset. The system 102 may retrieve such information, generate corresponding metadata, and turn this metadata into another metadata extent or may store the metadata in a new file or in a cold storage. The compactor 210 may move the metadata to a cold storage and use the bloom filter as described above to manage the location of the changes in an extent.

In an example embodiment, 30 updates may be made in the file, for example, between 0 to 1 MB, and in the $255^{th}$ MB to $256^{th}$ MB. The system 102 may reduce the information pertaining to the updates in one row of the delta stream. In order to maintain the delta extents indicative of updates, the system 102 may use the bloom filter. In an example embodiment, the bloom filter may be 64 bits large. In order to split the 256 MB of data into 64 Bits of the bloom filter, each bit of the bloom filter may be reserved for 4 MB changes. In order to represent the change made in the $1^{st}$ MB and the $256^{th}$ MB, the system 102 may only represent a 1 in the bitmap twice, one at the start and the other at the end of the bitmap. The bitmap may include 0s in between the two 1s. Therefore, the bitmap is indicative of the updates made to the file. As a result, the entire metadata may be reduced significantly by representing the delta stream in the form of the bitmap using the bloom filter.

Table 6 illustrates an exemplary compacting table as maintained by the compactor 210. Table 6 is shown for providing a better clarity and understanding of the subject matter and should not be construed as limiting.

TABLE 6

| Source Extent Id | Mod Version | Modifications | Delta Metadata Stream Id | Delta Metadata Extent Id | Offset | Size |
|---|---|---|---|---|---|---|
| E1 | 1 | 00....000000001 | DS1 | B1 | 0 | 50 |
| E5 | 1 | 01000....000001 | DS1 | B5 | 0 | 00 |
| E7 | 2 | 00001.........111 | DS1 | B7 | 0 | 00 |
| E1 | 2 | 010000000000 | DS1 | B1 | 150 | 00 |

As shown in table 6, the extent E1 and the extent E5 are modified for Version 1. The "delta metadata stream id" field may represent the delta stream id where the metadata may be stored. The "offset" and the "size" may list the position in the delta metadata extent where the metadata is stored. The bloom filter may track the changes made to the extent. For example, the extent E1 may have changes in 0-4 MB, and the extent E5 may have changes in 248-252 MB and 0-4 MB, as illustrated by the placement of 1s in the modifications bitmap of table 6.

In an example embodiment, the metadata cold storage may be in another metadata extent that is affinitized to the original extent. Therefore, when a user is trying to read the data present in an extent, the system 102 can read all the update metadata from the metadata extent affinitized to the extent. Since they are affinitized to the original extent, the network latency to retrieve this information is very minimal.

In an example embodiment, when "Get" on the file may be called, the compactor 210 may perform an "OR" operation for all the bloom filters and may provide the modification locations for an extent for a given version. For example, if the user requests the changes till version 5, and the extent E1 may have changes on version 1 and version 2, the compactor 210 may "OR" the bloom filter bitmap and provide the modifications bitmap.

Figure 6:
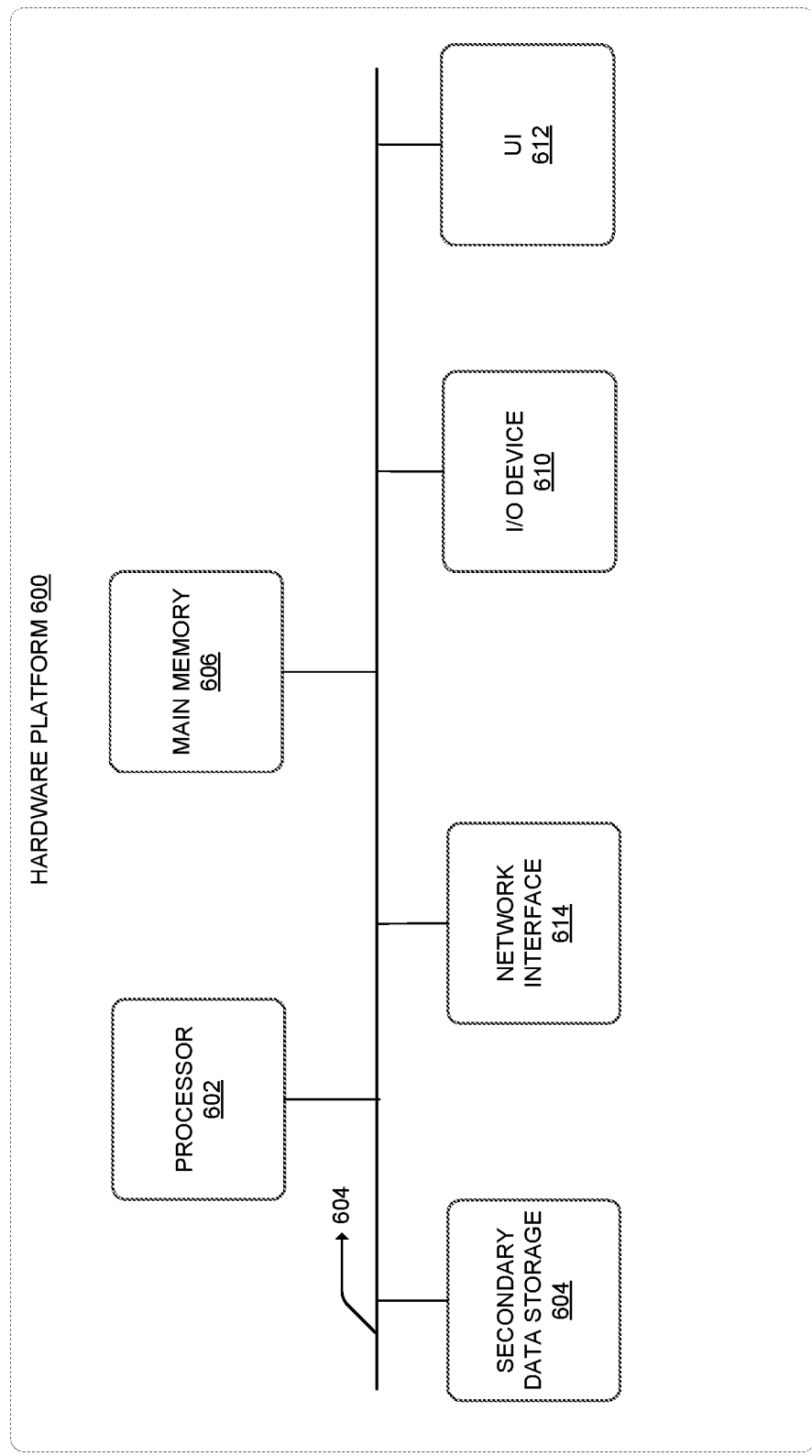
FIG. 6 illustrates a hardware platform for implementation of the system, according to an example of the present disclosure.

FIG. 6 illustrates a hardware platform 600 for implementation of the system 102, according to an example of the present disclosure. In an example embodiment, the hardware platform 600 may be a computing device for implementing the system 102 that may be used with the examples described herein. The computing device may represent a computational platform that includes components that may be in a server or another computing device. In an example embodiment, the computing device may include, but is not limited to, a laptop, a desktop, and a smartphone. The computing device may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computing device may include a processor 602 that may implement or execute machine readable instructions for performing some or all of the methods, functions, techniques and/or other processes described herein. Commands and data from the processor 602 may be communicated over a communication bus 604. The computing device may also include a main memory 606, such as a random access memory (RAM), where the machine readable instructions and data for the processor 602 may reside during runtime, and a secondary data storage 608, which may be a non-volatile memory and may store machine readable instructions and data. The main memory 606 and the data storage 608 are examples of non-transitory computer readable mediums. The main memory 606 and/or the secondary data storage 608 may store data used by the system 102, such as an object repository including web objects, configuration data, test data, etc.

The computing device may include an Input/Output (I/O) device 610, such as a keyboard, a mouse, a display, etc. The input/output device 610 may include a user interface (UI) 612 for interacting with a user of the system 102. The UI 612 may operate with I/O device 610 to accept from and provide data to a user. The computing device may include a network interface 614 for connecting to a network. Other known electronic components may be added or substituted in the computing device. The processor 602 may be designated as a hardware processor. The processor 602 may execute various components of the system 102 described above and perform the methods described below.

Figure 7:
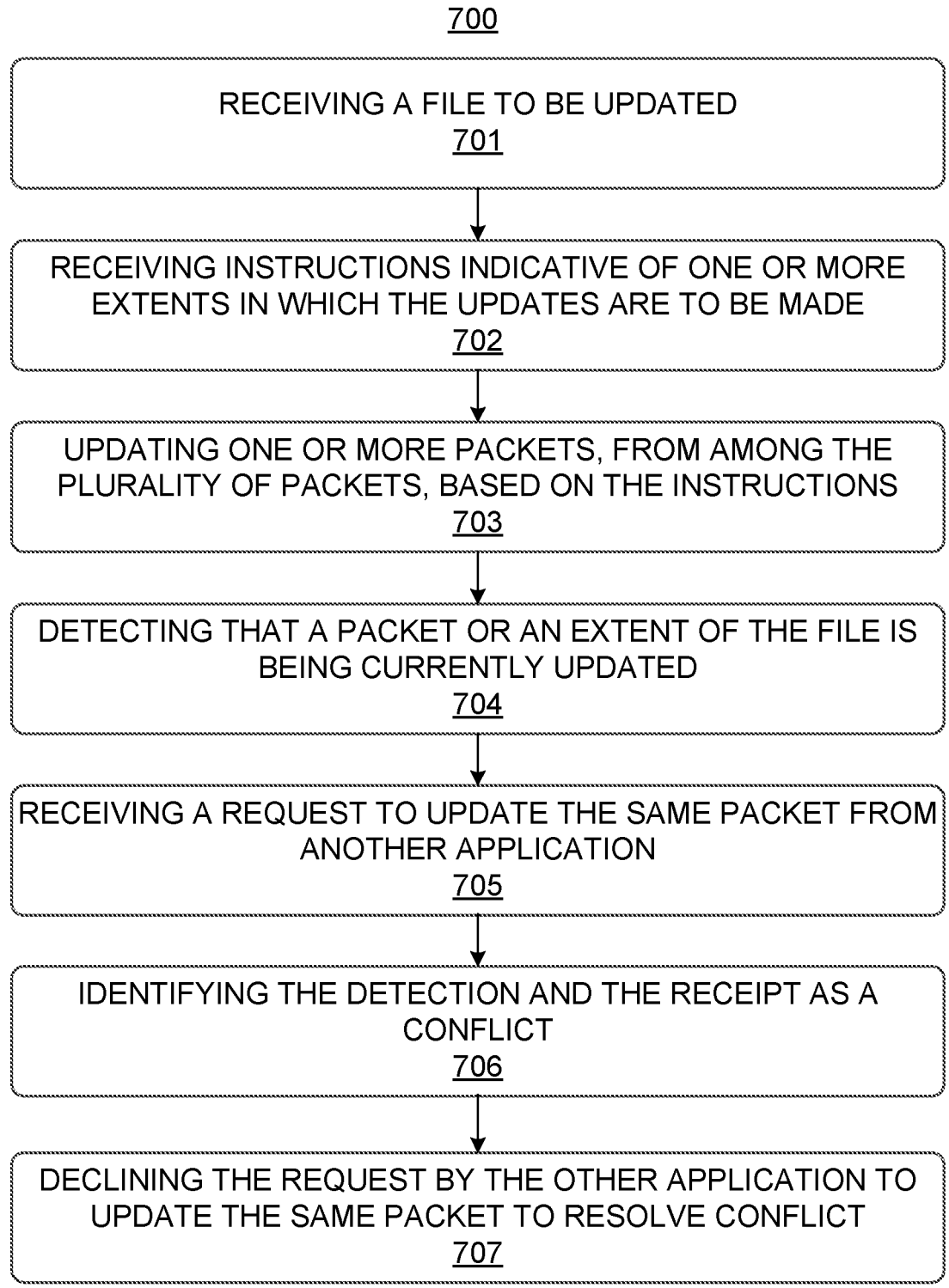
FIG. 7 illustrates a flowchart depicting a computer-implemented method for updating a file and conflict detection in a distributed file framework, according to an example embodiment of the present disclosure.

FIG. 7 illustrates a flowchart depicting a computer-implemented method 700 for updating a file in a distributed file store, according to an example embodiment of the present disclosure. For the sake of brevity, details of the system 102 which are already explained in the description of FIG. 1, FIG. 2, FIG. 3, FIG. 4, FIG. 5, and FIG. 6 are not explained in detail in the description of FIG. 7.

The method 700 may be performed by one or more servers or other types of computers including at least one processor executing machine readable instructions embodying the methods. For example, the system 102 illustrated in FIG. 1 may store machine readable instructions embodying the method 700, and the processor 602 may execute the machine readable instructions. The method 700 is described by way of an example as being performed by the system 102.

At 701, the method 700 includes receiving the file to be updated. The file is formed of a plurality of extents. An extent is indicative of a piece of data content of the file. Further, the extent is formed of a plurality of packets of substantially equal size. In an example embodiment, the receiver 202 of the system 102 receives the file to be updated.

At 702, the method 700 includes receiving instructions indicative of one or more extents of the file in which the updates are to be made. In an example embodiment, the receiver 202 of the system 102 receives the instructions.

At 703, the method 700 includes updating one or more packets, from among the plurality of packets, based on the instructions. In an example embodiment, the updater 204 of the system 102 updates the packets.

At 704, the method 700 includes detecting that a packet or an extent of the file is being currently updated by an application. In an example embodiment, the conflict detector 208 may detect that the packet is being updated.

At 705, the method 700 includes receiving a request to update the same packet of the file from another application. In an example embodiment, the conflict detector 208 or the receiver 202 may receive the request.

At 706, the method 700 includes identifying the detection and the receipt as a conflict. In an example embodiment, the conflict detector 208 may identify the conflict.

At 707, the method 700 includes declining the request by the other application to update the same packet to resolve the conflict. In an example embodiment, the conflict detector 208 may decline the request.

In an example embodiment, the method 700 includes disintegrating the one or more extents into the plurality of packets of substantially equal size. The size of the plurality of packets is determined based on performance results, a size of the file, and usage patterns of the file. Further, delta packets corresponding to the updates made in the packets may be generated. A delta packet is indicative of a change made in an original packet. Subsequently, the one or more packets may be read along with the delta packets for analysis of the updated file.

In an example embodiment, the method 700 may include generating a delta block extent indicative of updates made to an extent. The delta block extent may be linked with the extent being updated of an original data stream of the file for further analysis. The method 700 may further include storing the delta block extent either in the corresponding extent or in a second extent placed adjacent to the extent.

In an example embodiment, the method 700 may include storing a large sized file across multiple machines in form of disintegrated portions of data, and updating a portion of the large sized data that is stored in a first machine. Subsequently, the method 700 may include generating a delta extent corresponding to the update made to the portion, and storing the delta extent either in the first machine or in a second machine placed in proximity of the first machine. The second machine is identified based on a network map of machines that is indicative of at least one of locations, operational statuses, and space available in the machines.

In an example embodiment, the method 700 may include generating one or more versions of the file. Each version may correspond to an update made to the packets of the file.

In an example embodiment, the method 700 may include reducing information pertaining to updates made to the file in a single row of a delta stream, and representing the delta stream in form of a bitmap using a bloom filter. The bitmap is indicative of the updates made to the file.

Figure 8:
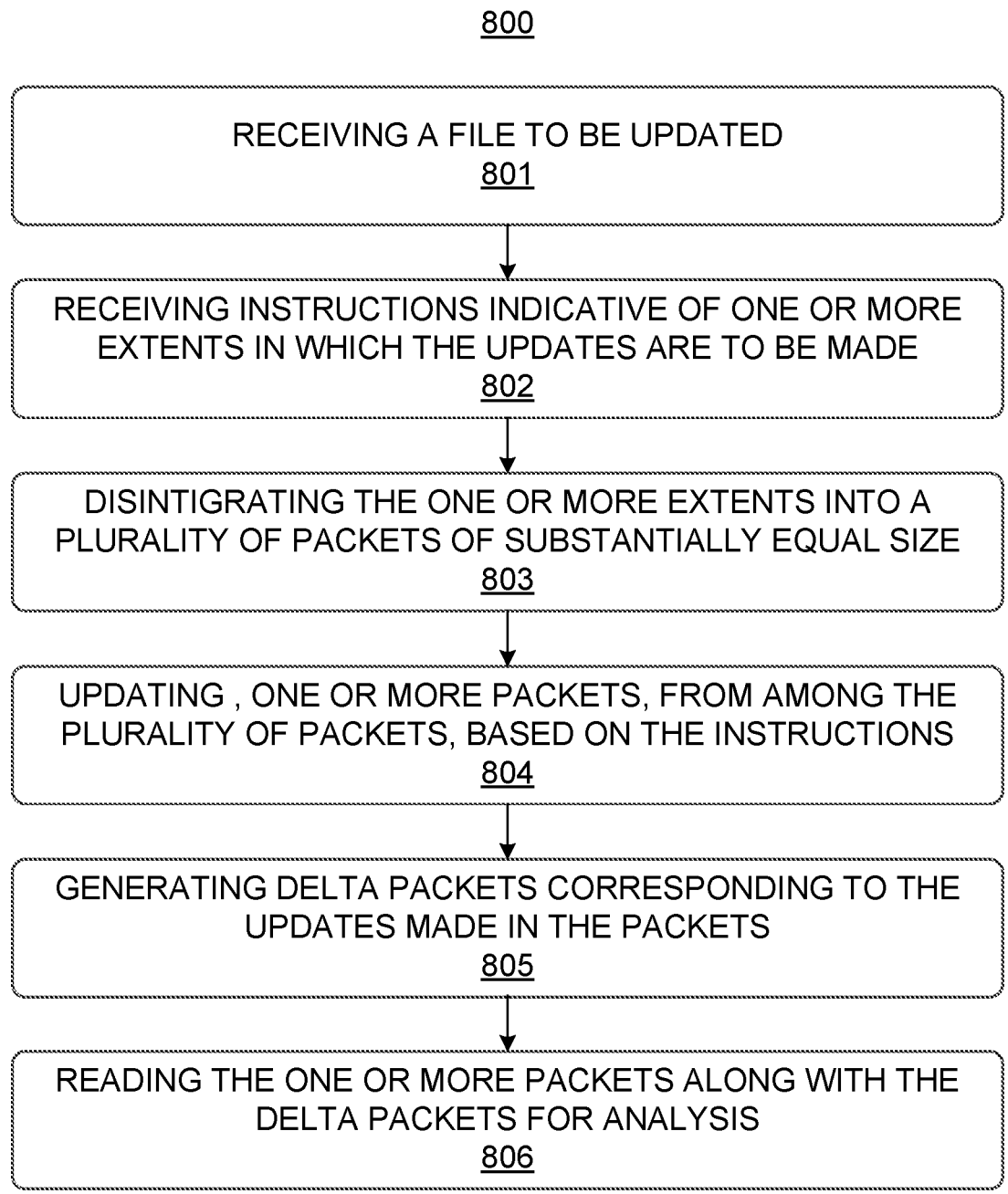
FIG. 8 illustrates a flowchart depicting a computer-implemented method for updating a file in a distributed file framework, according to an example embodiment of the present disclosure.

FIG. 8 illustrates a flowchart depicting a computer-implemented method 800 for updating a file in a distributed file store, according to an example embodiment of the present disclosure. For the sake of brevity, details of the system 102 which are already explained in the description of FIG. 1, FIG. 2, FIG. 3, FIG. 4, FIG. 5, and FIG. 6 are not explained in detail in the description of FIG. 8.

The method 800 may be performed by one or more servers or other types of computers including at least one processor executing machine readable instructions embodying the methods. For example, the system 102 illustrated in FIG. 1 may store machine readable instructions embodying the method 800, and the processor 602 may execute the machine readable instructions. The method 800 is described by way of an example as being performed by the system 102.

At 801, the method 800 includes receiving the file to be updated. The file is formed of a plurality of extents. An extent is indicative of a piece of data content of the file. In an example embodiment, the receiver 202 of the system 102 receives the file to be updated.

At 802, the method 800 includes receiving instructions indicative of one or more extents of the file in which the updates are to be made. In an example embodiment, the receiver 202 of the system 102 receives the instructions.

At 803, the method 800 includes disintegrating the one or more extents into a plurality of packets of substantially equal size. The size of the plurality of packets is determined based on the performance results, the size of the file, and the usage patterns of the file. In an example embodiment, the updater 204 of the system 102 disintegrates the extents.

At 804, the method 800 includes updating one or more packets, from among the plurality of packets, based on the instructions. In an example embodiment, the updater 204 updates the packets.

At 805, the method 800 includes generating delta packets corresponding to the updates made in the packets. A delta packet is indicative of a change made in an original packet. In an example embodiment, the updater 204 generates the delta packets.

At 806, the method 800 includes reading the packets along with the delta packets for analysis of the updated file. In an example embodiment, the updater 204 reads the packets along with the delta packets.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

What is claimed is:

1. A system for updating a file and resolving conflict in updating of the file in a distributed file store, the system comprising:
   a processor;
   a receiver to:
      receive the file to be updated, the file being formed of a plurality of extents, wherein each extent is indicative of a piece of data content of the file; and
      receive instructions indicative of one or more extents of the file in which an update is to be made;
   an updater, executed by the processor and in communication with the receiver, to, responsive to receiving the instructions, disintegrate the one or more extents into a plurality of packets of substantially equal size, wherein the substantially equal size is determined based on performance results, a size of the file, and usage patterns of the file, and update a packet, from among the plurality of packets, based on the instructions; and
   a conflict detector in communication with the receiver and the updater to:
      detect that a portion of the file, wherein the portion of the file comprises the packet or an extent of the file containing the packet, is being currently updated by an application;

receive a request to update the same portion of the file from another application;
identify the detection and the receipt as a conflict; and
decline the request by the another application to update the same portion to resolve the conflict.

2. The system of claim 1 wherein the updater is further to:
generate a delta packet corresponding to the update made in the packet, wherein the delta packet is indicative of a change made in an original packet; and
read the packet along with the delta packet for analysis of the updated file.

3. The system of claim 2 wherein based on receiving a request to make another update to the packet, the updater is further to append the delta packet.

4. The system of claim 1 wherein the updater is further to generate a delta block extent indicative of the update, wherein the delta block extent is linked with an extent of the one or more extents being updated.

5. The system of claim 4 wherein the updater is further to store the delta block extent in the extent being updated.

6. The system of claim 4 wherein the updater is further to store the delta block extent in a second extent placed adjacent to the extent in the file.

7. The system of claim 1 wherein the updater is further to:
store the file across multiple machines,
wherein the packet that is updated is stored in a first machine of the multiple machines;
generate a delta extent corresponding to the update made to the packet stored in the first machine; and
store the delta extent in one of the first machine and a second machine, wherein the second machine is identified based on a network map of machines that is indicative of at least one of locations, operational statuses, and space available in the machines.

8. The system of claim 1, further comprising a version generator in communication with the updater to generate one or more versions of the file, wherein each version corresponds to an update made to the packet.

9. The system of claim 1, further comprising a compactor in communication with the updater and the conflict detector to:
reduce information pertaining to updates made to the file in a single row of a delta stream; and
represent the delta stream in a bitmap using a bloom filter, wherein the bitmap is indicative of the updates made to the file.

10. A system for updating a file and resolving conflict in updating of the file in a distributed file store, the system comprising:
a processor;
a receiver to:
receive an instruction to update an extent of a plurality of extents of the file;
an updater, executed by the processor and in communication with the receiver, to:
responsive to receiving the instruction to update the extent, disintegrate the extent into a plurality of packets of substantially equal size, wherein the substantially equal size is determined based on performance results, a size of the file, and usage patterns of the file; and
update a packet, from among the plurality of packets, based on the instruction; and
a conflict detector in communication with the receiver and the updater to:

detect that a portion of the file, wherein the portion of the file comprises the packet or an extent of the file containing the packet, is being currently updated by an application;
receive a request to update the same portion of the file from another application;
identify the detection and the receipt as a conflict; and
decline the request to update the same portion to resolve the conflict.

11. The system of claim 10, wherein the updater is further to:
store the file across multiple machines,
wherein the packet this is updated is stored in a first machine of the multiple machines;
generate a delta extent corresponding to the update made to the packet stored in the first machine; and
store the delta extent in one of the first machine and a second machine, wherein the second machine is identified based on a network map of machines that is indicative of at least one of a location, an operational status, and space available in machines.

12. The system of claim 11 further comprising a version generator in communication with the updater to generate one or more versions of the file, wherein each version corresponds to an update made to the packet.

13. The system of claim 10 further comprising a compactor in communication with the updater and the conflict detector to:
reduce information pertaining to updates made to the file in a single row of a delta stream; and
represent the delta stream in a bitmap using a bloom filter, wherein the bitmap is indicative of the updates made to the file.

14. A computer-implemented method for updating a file and resolving conflict in updating of the file in a distributed file store, the method comprising:
receiving the file to be updated, the file being formed of a plurality of extents, wherein each extent is indicative of a piece of data content of the file;
receiving instructions indicative of an extent of the plurality of extents in which an update is to be made;
responsive to receiving the instructions, disintegrating the extent into a plurality of packets of substantially equal size, wherein the substantially equal size is determined based on performance results, a size of the file, and usage patterns of the file;
updating a packet, from among the plurality of packets, based on the instructions;
detecting that a portion of the file, wherein the portion of the file comprises the packet or an extent of the file containing the packet, is being currently updated by an application;
receiving a request to update the same portion of the file from another application;
identifying the detection and the receipt as a conflict; and
declining the request by the another application to update the same portion to resolve the conflict.

15. The method of claim 14 further comprising:
generating a delta packet corresponding to the update made in the packet, wherein a delta packet is indicative of a change made in an original packet; and
reading the packet along with the delta packet for analysis of the updated file.

16. The method of claim 14 further comprising generating a delta block extent indicative of the update, wherein the delta block extent is linked with the extent being updated.

17. The method of claim 16 further comprising storing the delta block extent in one of a corresponding extent and a second extent placed adjacent to the extent being updated.

18. The method of claim 16 further comprising:
storing the file across multiple machines,
wherein the packet that is updated is stored in a first machine of the multiple machines;
generating a delta extent corresponding to the update made to the packet stored in the first machine; and
storing the delta extent in one of the first machine and a second machine, wherein the second machine is identified based on a network map of machines that is indicative of at least one of locations, operational statuses, and space available in the machines.

19. The method of claim 14 further comprising generating one or more versions of the file, wherein each version corresponds to the update.

20. The method of claim 14 further comprising:
reducing information pertaining to the update in a single row of a delta stream; and
representing the delta stream in a bitmap using a bloom filter, wherein the bitmap is indicative of the update.

21. A system for updating a file in a distributed file store, the system comprising:
a processor;
a receiver to:
receive the file to be updated, the file being formed of a plurality of extents, wherein each extent is indicative of a piece of data content of the file; and
receive an instruction indicative of an extent of the file in which an update is to be made; and
an updater, executed by the processor and in communication with the receiver, the updater to:
responsive to receiving the instruction, disintegrate the extent into a plurality of packets of substantially equal size, wherein the substantially equal size is determined based on a performance result, a size of the file, and a usage pattern of the file;
update a packet, from among the plurality of packets, based on the instruction;
generate delta packets corresponding to the update, wherein each delta packet is indicative of a change made in an original packet of the file; and
read the packet along with the delta packets for analysis of the updated file.

22. The system of claim 21, wherein the updater is further to:
initiate a first set of updates for a first file in a first transaction;
initiate a second set of updates for a second file in a second transaction, wherein the first set of updates and the second set of updates are initiated based on user instructions; and
commit the first set of updates along with the second set of updates.

23. A method for updating a file in a distributed file store, the method comprising:
receiving the file to be updated, the file being formed of a plurality of extents, wherein each extent is indicative of a piece of data content of the file;
receiving an instruction indicative of an extent of the file in which an update is to be made;
responsive to receiving the instruction, disintegrating the extent into a plurality of packets of substantially equal size, wherein a size of the plurality of packets is determined based on a performance result, a size of the file, and a usage pattern of the file;
updating a packet, from among the plurality of packets, based on the instruction;
generating a delta packet corresponding to the update made in the packet, wherein the delta packet is indicative of a change made in an original packet; and
reading the packet along with the delta packet for analysis of the updated file.

24. The method of claim 23 further comprising:
initiating a first set of updates for the file in a first transaction;
initiating a second set of updates for a second file in a second transaction, wherein the first set of updates and the second set of updates are initiated based on user instructions; and
committing the first set of updates along with the second set of updates.

* * * * *